United States Patent [19]
Kwok et al.

[11] Patent Number: 5,386,073
[45] Date of Patent: Jan. 31, 1995

[54] HF ALKYLATION PROCESS

[75] Inventors: Tai W. Kwok; Scott D. Love, both of Bartlesville, Okla.

[73] Assignee: Phillips Petroleum Company, Bartlesville, Okla.

[21] Appl. No.: 145,120

[22] Filed: Nov. 3, 1993

Related U.S. Application Data

[60] Division of Ser. No. 870,203, Apr. 13, 1992, Pat. No. 5,296,199, which is a continuation of Ser. No. 521,876, May 11, 1990, abandoned.

[51] Int. Cl.$^6$ .............................................. C07C 2/60
[52] U.S. Cl. ................................... 585/464; 422/187; 585/723; 585/922
[58] Field of Search ................. 165/176, 903, 145; 585/464, 723, 921, 922; 422/201, 234, 235, 187, 189, 190, 191

[56] References Cited

U.S. PATENT DOCUMENTS 4,972,903  11/1990  Kwok .................................. 165/158
5,296,199  3/1994  Kwok et al. ......................... 165/145

OTHER PUBLICATIONS

Ludwig, Applied Process Design for Chemical and Petrochemical Plants, vol. III, Gulf Publishing Co., 1965, p. 14.
Bodger et al, Elements of Chemical Engineering, 2nd ed. 1936, pp. 162–165.

*Primary Examiner*—Peter Kratz
*Attorney, Agent, or Firm*—Charles W. Stewart

[57] ABSTRACT

A shell-and-tube heat exchanger with a tube sheet having partition grooves used to form joints with partition plates contained within the exchanger head. The partition plates define chambers within the head of the exchanger which direct the fluid through the exchanger tubes and which allow for the use of an unequal number of tubes per tube-side pass.

4 Claims, 4 Drawing Sheets

HF ALKYLATION PROCESS

This application is a divisional of application Ser. No. 07/870,203, filed Apr. 13, 1992, now U.S. Pat. No. 5,246,199 continuation of application Ser. No. 07/521,876, filed May. 11, 1990, now abandoned.

This invention relates generally to improvements in shell-and-tube heat exchangers and more particularly, but not by way of limitation, to shell-and-tube heat exchangers for vaporizing liquid or condensing vapor and having improved tube sheet and front-end head designs.

In industry, heat transfer methods form an important part of almost all chemical processes. One of the most commonly used pieces of heat transfer equipment is the shell-and-tube type heat exchanger. Descriptions of the various types of heat exchangers are summarized in many well known publications, such as, for example, *Perry's Chemical Engineers' Handbook*, chap. 11 at 3–21 (Green, 6th ed. 1984). Generally, this type of heat exchanger comprises a bundle of tubes having an inlet head in fluid flow communication with an outlet head. The tube bundle is enclosed in a shell that enables one fluid to flow into contact with the outer surfaces of the tubes in the tube bundle and to transfer heat from or to another fluid flowing through the tubes in the bundle.

Shell-and-tube heat exchangers may be used in essentially all types of functional services such as condensing, cooling, vaporizing, evaporating, and mere exchanging of heat energy between two different fluids. Furthermore, shell-and-tube heat exchangers are capable of handling practically any type of chemical compounds including, for example, water, steam, hydrocarbons, acids, and bases. In the particular petroleum refinery process of HF alkylation, shell-and-tube heat exchangers are used in a variety of services some of which include HF acid vaporization and condensation. Because of the highly corrosive nature of HF acid, operators of HF alkylation processes have encountered significant problems with corrosion, erosion, scaling, and fouling in the shell-and-tube heat exchanger bundles used in HF acid handling service. In particular, with HF acid vaporizers, operators have occasionally experienced severe corrosion and erosion in the tube sheet area near the outlets of the tubes of the final tube passes of the exchangers, and they have experienced severe scaling and fouling in the inlet areas of the first tube passes of the exchangers. As a result of this damage, some operators have only been able to obtain tube bundle lives which are but a fraction of their design life expectancies. In fact, some operators have only been able to obtain useful tube bundle lives of as much as six months for conventional exchangers which have tubes constructed of highly corrosion resistant monel material. These bundles would normally have expected useful lives of three years or more.

Because of the nature and type of corrosion or erosion and the specific locations where such corrosion and erosion typically occur within HF acid vaporizing heat exchangers, operators and their technical staffs have thought that the causes of the excessive damage in the HF acid heat exchangers have been related to the type of exchangers or the type of tube sheets used and to the highly corrosive nature of the HF acid being handled. In attempting to address these problems, operators have tried numerous different approaches, such as using double tube sheets, changing the methods of rolling the tubes within the tube sheets, and using various techniques for seal welding the exchanger tube ends to the tube sheets. All these attempts at resolving the corrosion or erosion problems associated with using HF acid vaporizers are typical responses to resolving the type of corrosion or erosion operators have observed, but these attempts have failed to cure these problems. It has never occurred to those within the industry that the cause of the corrosion or erosion damage within the tubes of the HF acid vaporizers has not been solely related to the corrosive nature of the fluid compound being handled; but, rather, we have discovered that its cause is related to the flow characteristics of the fluid within the tubes.

Accordingly, the present invention was developed in response to the specific problems relating to the use of HF acid vaporizers that operators of HF alkylation processes have long struggled with.

It is an object of this invention to provide a shell-and-tube heat exchanger optimally designed for the vaporization of HF acid.

Another objective of this invention is to provide an apparatus which helps to increase the useful life of a shell-and-tube heat exchanger used in HF acid vaporization service.

A further object of this invention is to reduce the cost of operation of an HF alkylation process.

Still another object of-this invention is to increase the reliability of the apparatus employed in the performance of an HF alkylation process.

The present invention is an improved shell-and-tube heat exchanger of the type having a removable tube bundle used to vaporize HF acid. The improvement involves arranging fluid flow through the tubes of a multiple-pass, HF acid vaporizer in order to provide a more even velocity profile throughout the fluid flow path.

Other aspects, objects, and advantages of this invention will become apparent from a study of this disclosure, appended claims, and the drawings in which:

This invention is designed to reduce corrosion or erosion problems which have been found to occur in the HF acid vaporizers and condensers used in the HF acid regeneration circuit contained in many typical refinery HF alkylation processes. It has been discovered that, in many cases and in contrast to previously held theories, the cause of such corrosion and erosion damage in HF acid heat exchangers has been due primarily to excessively high tube-side fluid velocities or, in the case of fouling, due to excessively low tube-side fluid velocities. The problems associated with poor velocity distribution through the tubes of a heat exchanger result from the phase change which takes place in the fluid flowing within the exchanger tubes. As a result of this phase change, the volumetric flow rate changes as gas or liquid passes through the exchanger tubes. This change in volumetric flow rate results in a change in fluid velocity; and, in the case of a vaporizing fluid, its velocity will increase as it passes through the heat exchanger creating a greater potential for the erosion or corrosion or both associated with such excessively high tube-side fluid velocities.

The approach used to address the problems related to excessively high tube-side fluid velocities and excessively low tube-side fluid velocities in accordance with this invention is to provide a multi-pass heat exchanger charaterized by multiple tube passes having unequal numbers of tubes per pass. This multi-pass heat exchanger is constructed by building baffles or partitions into the head and return ends of an exchanger which direct the fluid through the tubes into their proper relative positions. By providing for an exchanger with an unequal number of tubes per pass, an exchanger can be designed to maintain a relatively even fluid velocity destribution throughout the length of the exchanger tubes even though there is a phase change in the fluid as it passes through the tubes. By controlling the fluid velocity on the tube-side of an exchanger, the corrosion, erosion, and fouling that are related to a poor velocity profile through the tubes can be minimized with the consequent improvement in exchanger tube useful life and in HF alkylation process operating efficiency.

Figure 1:
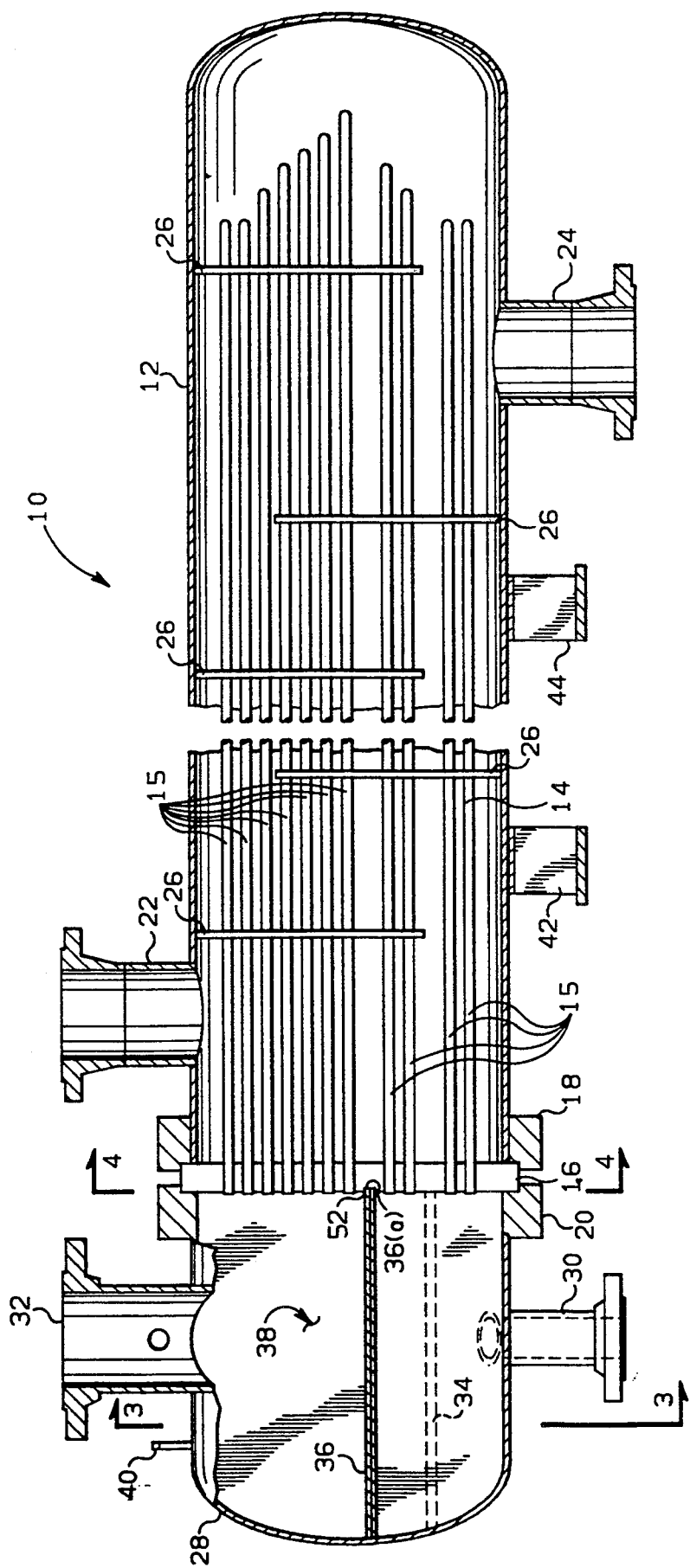
FIG. 1 is an elevational view of a shell-and-tube heat exchanger with portions thereof broken away to more clearly illustrate certain features of the present invention.

Now referring to the drawings, FIG. 1 depicts a shell-and-tube heat exchanger 10 comprising shell 12 and tube-bundle 14. The tube bundle 14 is composed of a plurality of U-shaped tubes 15 affixed to tube sheet 16 by .any commonly used technique for rolling tubes inside drilled tube holes. Tubes 15 of tube bundle 14 and tube sheet 16 can be arranged in any commonly used symmetrical pattern such as in a triangular pitch or a square pitch, and they can be made of any variety of material which can include, for example, steel, copper, monel, admiralty brass, 70-30 copper-nickel, aluminum bronze, aluminum, and the stainless steels. A presently preferred embodiment, however, comprises tubes 15 arranged in a square pitch pattern with the tubes 15 fabricated from a monel material. As shown in FIG. 1, tube bundle 14 is of the removable, U-tube type having a single tube sheet 16, but this invention is not limited to U-tube type construction and may be of any type of construction which allows for the removal of tube bundle 14 from shell 12 including floating head type bundles. Furthermore, any acceptable tube-sheet construction, including double tube sheets, may be used instead of a single tube sheet. Tube sheet 16 is held in place by shell flange 18 and channel flange 20 suitably interconnected by bolts (not shown).

Shell 12 is provided with nozzles 22 and 24 spaced as shown to induce flow of shell-side fluid across and along the external length of the tubes of tube bundle 14. This one-pass, shell-side fluid flow is the preferred arrangement under the presently preferred embodiment of this invention. Generally, it is the most commonly used flow arrangement in typically designed shell-and-tube exchangers; however, other shell-side flow arrangements are possible, such as a split-flow, double split-flow, divided flow and cross flow which require either additional nozzles or different nozzle arrangements or both. Tube bundle 14 is equipped with segmental type baffles 26, spaced at convenient distances, which improve heat transfer by inducing turbulent fluid flow and causing the shell-side fluid to flow at right angles to the axes of tubes 15 of tube bundle 14. Segmental baffles 26 are made from circular, drilled plates which allow the insertion of the exchanger tubes. The diameter of the segmental baffles 26 approaches that of the inner diameter of shell 12 and approximately twenty-five percent of each baffle 26 is cut-out and removed from the drilled plate. The cut-out portions of the baffles 26 are alternately rotated 180° relative to one another so as to provide an up-and-down, side-to-side or zig-zag type fluid flow pattern across tube bundle 14. While the presently preferred embodiment of this invention uses twenty-five percent cut segmental baffles, there are other types which can be used such as disc and donut baffles, rod baffles, orifice baffles, double segmental baffles, and triple segmental baffles.

Figure 2:
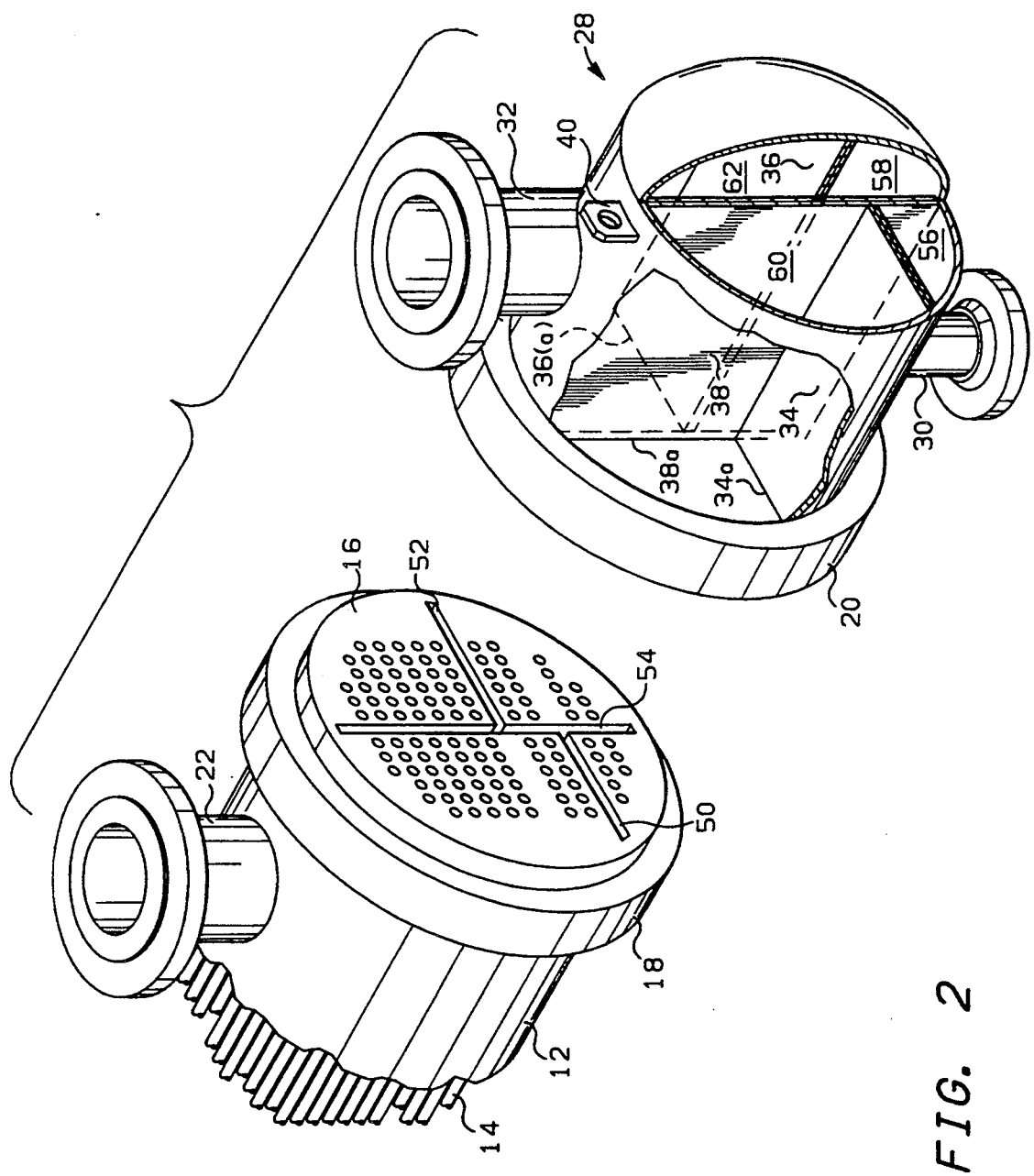
FIG. 2 is an exploded isometric view illustrating the tube bundle, the tube sheet, and the front-end head of a heat exchanger constructed in accordance with the present invention.
Figure 3:
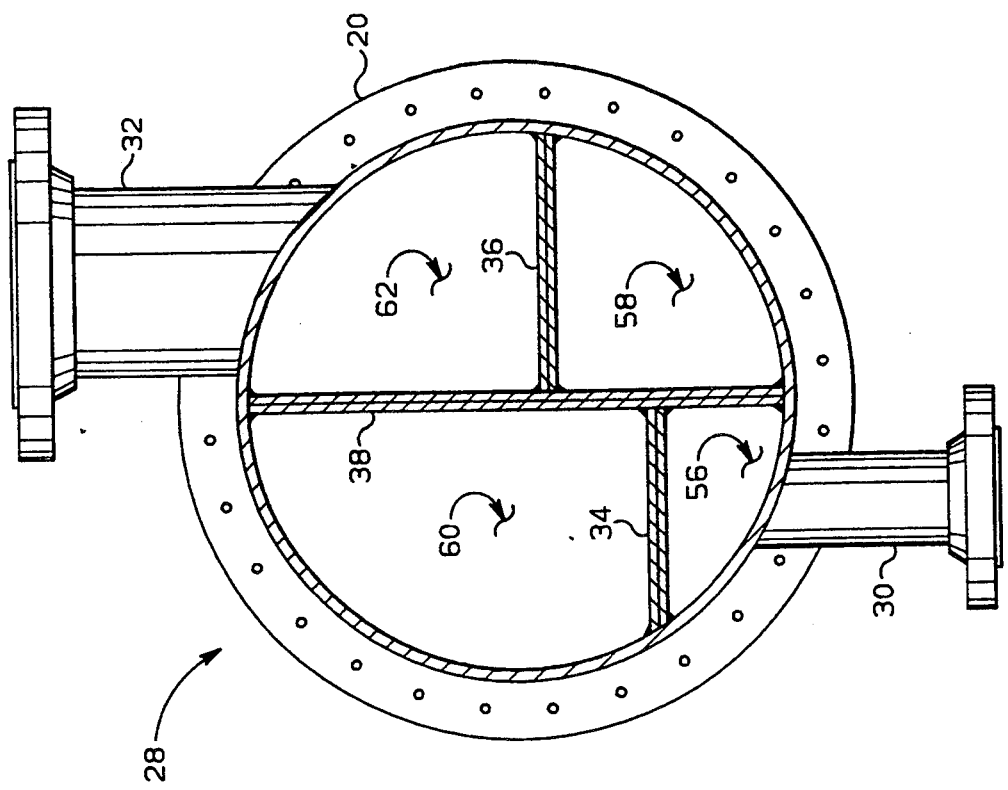
FIG. 3 is a cross sectional view taken along line 3—3 of FIG. 1 showing the inside of the front-end stationary head of the shell and tube heat exchanger of FIG. 1.
Figure 4:
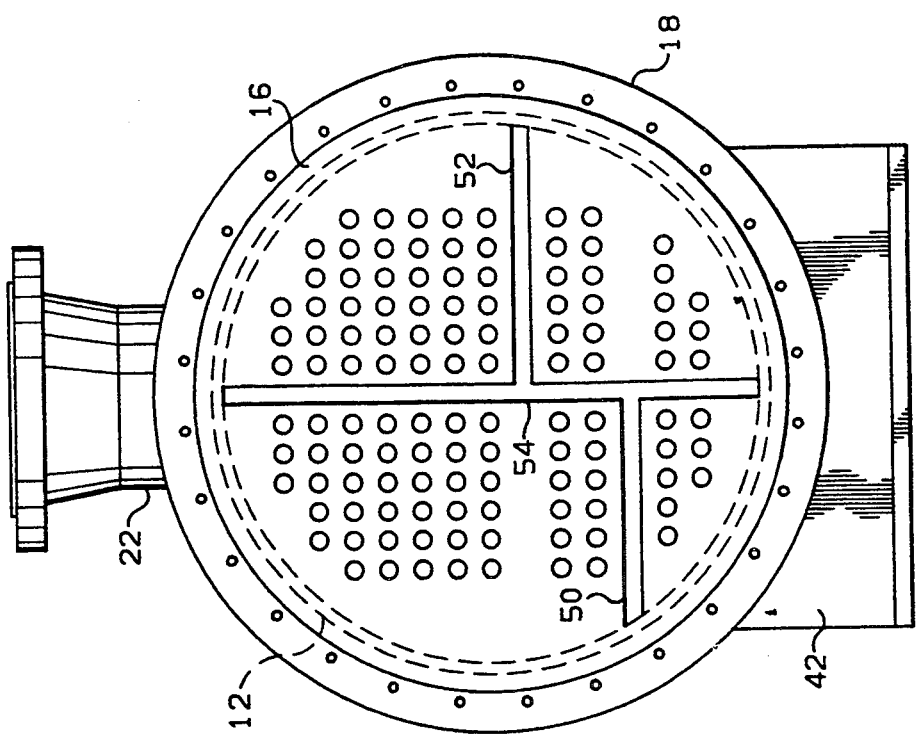
FIG. 4 is a cross-sectional view taken along line 4—4 of FIG. 1.

Referring to FIGS. 1, 2 and 3, there is shown a stationary front-end bonnet head 28 having inlet nozzle 30, outlet nozzle 32, two horizontally oriented pass partitions 34 and 36, and one vertically oriented pass partition 38, and is equipped with channel flange 20 for assembly with shell 12 by bolts (not shown) passing through channel flange 20 and opposing shell flange 18. While it is generally preferred to use bolts and flanges as a fastener means, any other suitable means such as clamps and latches for connecting stationary-front-end bonnet head 28 and shell 12 with tube sheet 16 therebetween can be used. Flanges 18 and 20 will clamp on tube sheet 16, which is designed in accordance with this invention, in a closed position. The joints between the outer edges of pass partitions 34, 36, and 38 and corresponding partition grooves 50, 52, and 54 formed in the face of tube sheet 16, as shown in FIGS. 2 and 4, are formed by inserting the outer edge 34a of pass partition 34 into horizontal partition groove 50, the outer edge 36a of horizontal pass partition 36 into horizontal partition groove 52, and the outer edge 38a of verticle pass partition 38 into verticle partition groove 54, (partition grooves, 50 and 54 are not shown in FIG. 1, but they are shown in FIG. 2 and FIG. 4). The joints are sealed with a suitable gasket (not shown) and with force created by the torqing of the bolts which connect channel flange 20 and shell flange 18. Bonnet head 28 is fitted with lifting lug 40. The shell 12 is provided with support saddles 42 and 44 for support and mounting upon a foundation.

FIG. 2 shows the lay-out of tube sheet 16 having a group of three partition grooves 50, 52 and 54 formed thereon and showing bonnet head 28 with pass partition plates 34, 36 and 38 along with an inlet nozzle 30 and an outlet nozzle 32. Partition groove 54 is a vertical partition groove which is formed along the vertical center line of tube sheet 16. The vertical center line of tube sheet 16 is defined as an imaginary line parallel to the faces of tube sheet 16 which divides the faces of tube sheet 16 into symmetrical halves. Vertical partition groove 54 has a length and is formed upon the face of tube sheet 16 along the vertical center line. The center of partition groove 54 is the midpoint of the length of partition groove 54, which is the point equidistant from all points on the outer boundaries of the partition groove 54. Partition grooves 50 and 52 are horizontal partition grooves which extend normally from the vertical center line of tube sheet 16.

The partition plates 34, 36 and 38 are permanently affixed inside bonnet head 28 either by welding or casting in place or any other suitable means. These partitions serve to direct the fluid flow through the tubes in a specific pattern as, for example, required by a changing fluid phase as the fluid passes through the exchanger tubes 15. While FIG. 2 shows the preferred embodiment of this invention providing for a six-pass exchanger having an unequal number of tubes per pass, this invention, however, can be extended to heat exchangers that use floating-head type tube bundles as described hereinbelow.

The particular embodiment as depicted in FIG. 2 and the cross-sectional views of FIG. 3 and FIG. 4 illustrate the fluid flow through the exchanger tubes, the apparatus, and its operation. In operation, liquid to be vaporized enters exchanger 10 through inlet nozzle 30 into first chamber 56 where the liquid accumulates and then flows into a portion of tubes 15 contained within tube sheet 16 comprising the first tube pass. Because tubes 15 are of the U-tube type design, the incoming liquid passes through tubes 15 of the first tube pass and returns to enter second chamber 58 via the second tube pass. Within second chamber 58, the fluid loops around and enters the third tube pass where the fluid passes axially down the length of tubes 15 of the third tube pass and returns to enter chamber 60 via the fourth tube pass. Within third chamber 60, the fluid makes another loop to enter the fifth tube pass where it flows axially down the length of tubes 15 and returns via the sixth tube pass to enter the fourth chamber 62. From fourth chamber 62, the vaporized fluid exits the chamber via outlet nozzle 32. As the vapor passes through tubes 15 of exchanger 10 and tube bundle 14 it undergoes the vaporization process where at any given position within the fluid flow path there will be either a vapor or a liquid or some mixture thereof. As a result of this vaporization process, the fluid volumetric flow rate increases as it passes through the exchanger causing an increase in fluid velocity. By providing an unequal number of tubes per tube-side pass, adjustment and optimization of the tube-side fluid flow velocities can be made which will minimize the amount of tube damage caused by fouling and corrosion and which will extend the useful life of the heat exchanger.

Figure 5:
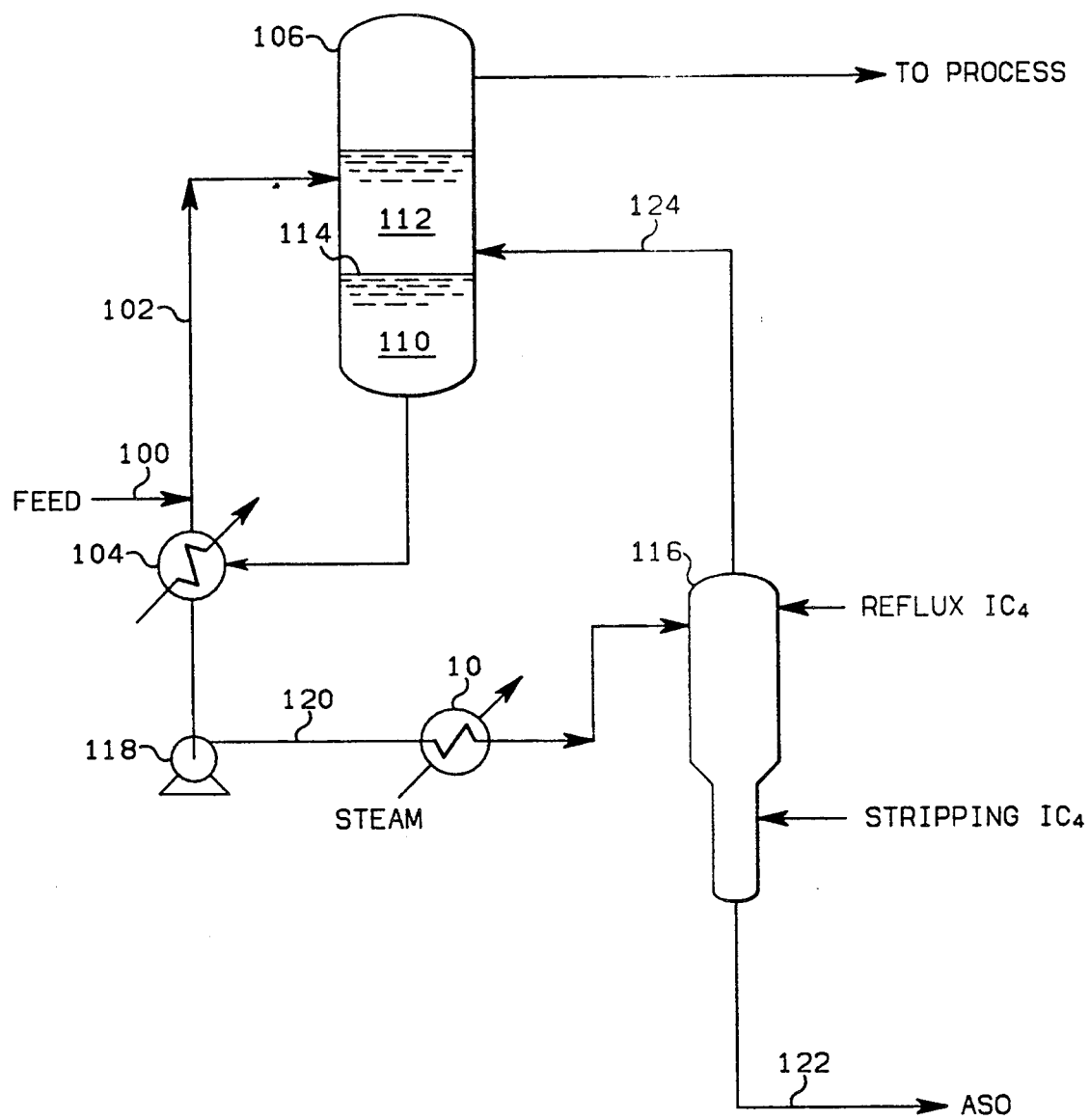
FIG. 5 is a schematic representation of the HF acid regeneration circuit of a typical HF alkylation process.

The heat exchanger as described hereinabove and as depicted in FIGS. 1, 2, 3 and 4 is further incorporated for use in the acid regeneration circuit of an HF akylation process. FIG. 5 is a schematic flow diagram of the acid regeneration circuit showing the relative location of the process equipment in the circuit and the location of the heat exchanger of this invention.

Hydrocarbon feed material comprising a mixture of olefins and isoparaffins is introduced through conduit 100 into the lower portion of riser-reactor 102 which is in fluid flow communication between the catalyst cooler 104 and the medial portion of settler vessel 106. The hydrocarbon feed material is introduced in the riser-reactor 102 at essentially the outlet of the catalyst cooler 104 where circulating HF acid catalyst flowing by natural convection from settler vessel 106 via conduit 108 through catalyst cooler 104 mixes with the injected hydrocarbons to form an admixture. The thus formed admixture rises upwardly through riser-reactor 102 where the reactor effluent discharges from riser-reactor 102 into settler vessel 106. Upon entering settler vessel 106, two separate liquid phases form with the catalyst phase 110 settling to the lower portion of settler vessel 106 and with the hydrocarbon phase 112 forming above the catalyst phase and with a liquid-liquid interface 114 being formed therebetween. Once the HF acid catalyst has settled out in the catalyst phase within the settler vessel 106, it once again begins the above-described cycle.

To regenerate the HF Catalyst, a portion of the inventory of HF acid contained in the catalyst phase 110 in the settler vessel 106 and appending equipment is charged, either continuously or intermittently, to acid rerun column 116 through feed pump 118 and conduit 120. Interposed in conduit 120 between feed pump 118 and acid rerun column 116 is heat exchanger 10, constructed in accordance with the present invention. Liquid HF acid is pumped by pump 118 through conduit 120 into the tube-side of heat exchanger 10 where the acid is vaporized by exchange of heat energy supplied by any suitable heat source such as steam. The vaporized acid is further fed via conduit 120 to acid rerun column 116 where a separation-takes place with the separated acid soluable oil being removed through conduit 122 and HF acid, having a significant reduction in the content of acid soluable oil and water, is removed overhead and charged through line 124 to the settler vessel 106.

EXAMPLE I

This calculated example is provided to show the benefits which can be achieved by using the disclosed invention. Shown in Table I are calculated heat exchanger values for a given flow rate within the tube-side of a typical symmetrically oriented six-pass exchanger (shown in "Before" column) and for an asymmetrically oriented six-pass exchanger having an unequal number of tubes per pass (shown in "After" column) constructed in accordance with the present invention, each being operated as a liquid vaporizer. The calculated values presented in Table I apply to a type BEU (i.e., bonnet head, one-pass shell, U-tube bundle heat exchanger) exchanger having 58 U-tubes with each tube comprising two essentially straight tube lengths with a radius section connecting each length. The tubes are 1 inch O.D.×12 BWG (Birmingham Wire Gauge) U-tubes oriented in a 1-174 inch square pitch pattern with the "Before" exchanger having 20 tube lengths in the first and second passes, 18 tube lengths in the third and fourth passes, and 20 tube lengths in the fifth and sixth passes. The "After" exchanger has 8 tube lengths each in passes one and two, 12 tube lengths each in passes three and four, and 38 tube lengths each in passes five and six. As reflected in Table I, the flow velocity of the entering liquid is substantially lower than the flow velocity of the exiting vapor. By reorienting the fluid flow through the exchanger tubes, a more preferred velocity distribution within the tubes can be obtained. The exiting vapor velocity is lowered and the entering liquid velocity is increased thus helping to reduce erosion caused by the high vapor velocities and to reduce fouling caused by low liquid velocities. Furthermore, the overall heat transfer coefficient is improved due to an improvement in velocity distribution. Reduction in the corrosion and erosion damage caused by the poor fluid velocity distribution results in an improvement in the useful life of the exchanger tubes and it results in a reduction in various capital and operating costs related to the exchanger.

TABLE I (Calculated)

Pertinent calculated values for a typical symmetrical six-pass exchanger and an asymmetrical six-pass exchanger incorporating unequal tubes per pass.

| | Before Inventive Feature | After Inventive Feature |
|---|---|---|
| Liquid in (lb/hr) | 6,300 | 6,300 |
| Volumetric flow in (ft$^3$/sec) | 0.037 | 0.037 |
| Liquid velocity in (ft/sec) | 0.55 | 1.39 |
| Vapor out (lb/hr) | 6,300 | 6,300 |
| Volumetric flow out (ft$^3$/sec) | 3.51 | 3.51 |
| Vapor velocity out (ft/sec) | 52.5 | 28.0 |
| Estimated Overall Heat-Transfer Coefficient (BTU/hr/ft/°F.) | 50 | 55 |
| Tube life extension resulting from unequal number of tubes per pass (years) | ½ to 2 | 2 to 4 |

That which is claimed is:

1. A method of operating an HF alkylation process system having a settler vessel having an upper end portion, a lower end portion, and a medial portion;

a riser-reactor having an upper end portion, a lower end portion, and a medial portion;

a catalyst cooler having an inlet means and an outlet means, with the outlet means thereof in fluid flow communication with the lower end portion of said riser-reactor;

a first conduit in fluid flow communication between the lower end portion of said settler vessel and said inlet means of said catalyst cooler;

a second conduit having a first end portion and a second end portion, with the first end portion thereof in fluid flow communication with the medial portion of said settler vessel and the second end portion thereof in fluid flow communication with the upper end portion of said riser-reactor;

an acid rerun column having an upper end portion, a lower end portion and a medial portion, with the upper end portion thereof in fluid flow communication with the medial portion of said settler vessel;

a third conduit having a first end portion and a second end portion, with the first end portion thereof in fluid flow communication with the outlet means of said catalyst cooler;

a pump having an inlet end and an outlet end, with the inlet end thereof in fluid flow communication with the second end portion of said third conduit, a fourth conduit having a first end portion and a second end portion, with the first end portion thereof in fluid flow communication with the outlet end of said pump;

a fifth conduit having a first end portion and a second end portion, with the second end portion thereof in fluid flow communication with the medial portion of said acid rerun column;

a shell-and-tube heat exchanger, comprising:

a shell having an open first end portion and a closed second end portion;

a first tube sheet securable to the open first end portion of said shell and having a first face and a second face and a plurality of apertures communicating between said first and second faces;

a plurality of U-shaped tubes having opposite open ends and operatively connected to said first tube sheet and extending away from the second face of said first tube sheet with the open ends of said U-shaped tubes in fluid flow communication with the first face of said first tube sheet via corresponding said apertures;

a vertical partition groove formed in the first face of said tube sheet in the center thereof thereby forming symmetrical halves of the first face of said first tube sheet disposed on either side of said vertical partition groove whereby the opposite open ends of each of said U-shaped tubes communicate with the corresponding symmetrical halves of the first face of said first tube sheet;

at least one horizontal partition groove formed in the first face of said first tube sheet extending from said vertical partition groove to an outside edge of said first tube sheet, positioned to divide the first face of said first tube sheet into asymmetrical portions;

a bonnet head having an inlet, and outlet, an open first end portion and a closed second end portion and securable at the open first end portion thereof to said first tube sheet and the open first end portion of said shell;

a vertical partition formed within said bonnet head in the center thereof thereby forming symmetrical chambers within said bonnet head on either side of said vertical partition, said vertical partition being sized and shaped to be closely received within said vertical partition groove when said bonnet head is secured to said first tube sheet and said shell;

at least one horizontal partition formed within said bonnet head extending between said vertical partition and said bonnet head thereby dividing one of said symmetrical chambers within said bonnet head to form additional chambers having unequal numbers of tubes per pass, said at least one horizontal partition being sized and shaped to be closely received within a corresponding at least one said horizontal partition grooves when said bonnet head is secured to said first tube sheet and said shell;

means operatively related to said shell and said bonnet head for mutually securing the open first end portion of said bonnet head, said first tube sheet and the open first end portion of said shell together;

inlet means in fluid flow communication between one of said additional chambers in said bonnet head and the second end portion of said fourth conduit; and an outlet means in fluid flow communication between another of said additional chambers in said bonnet head and the first end portion of said fifth conduit, said method comprising the steps of:

removing HF acid from said catalyst cooler;

charging said HF acid to said inlet means of said shell-and-tube heat exchanger; and vaporizing said HF acid within said plurality of U-shaped tubes to form a vaporized HF acid.

2. A method of operating said HF alkylation process system as recited in claim 1, further comprising removing said vaporized acid through said outlet means of said shell-and-tube heat exchanger.

3. A method of operating said HF alkylation process system as recited in claim 1 wherein said unequal number of tubes per pass increases with every other pass.

4. A method of operating said HF alkylation process system as recited in claim 2 wherein said unequal number of tubes per pass increases with every other pass.

* * * * *